United States Patent
Ruto et al.

(10) Patent No.: US 9,811,620 B2
(45) Date of Patent: Nov. 7, 2017

(54) LATTICE STRUCTURE INTERFACING

(71) Applicant: Within Technologies Ltd., London (GB)

(72) Inventors: Anthony Christopher Kipkirui Yegon Ruto, Basingstoke (GB); Siavash Haroun Mahdavi, London (GB); Hooman Shayani, Longfield (GB)

(73) Assignee: Within Technologies Ltd., London (GB)

( * ) Notice: Subject to any disclaimer, the term of this patent is extended or adjusted under 35 U.S.C. 154(b) by 0 days.

(21) Appl. No.: 15/201,899

(22) Filed: Jul. 5, 2016

(65) Prior Publication Data
US 2017/0011155 A1    Jan. 12, 2017

Related U.S. Application Data

(60) Provisional application No. 62/189,908, filed on Jul. 8, 2015.

(51) Int. Cl.
*G06F 17/50*    (2006.01)

(52) U.S. Cl.
CPC .................. *G06F 17/5036* (2013.01)

(58) Field of Classification Search
CPC .................................................. G06F 17/5036
USPC ........................................................ 716/106
See application file for complete search history.

(56) References Cited

U.S. PATENT DOCUMENTS

| 8,260,589 B1* | 9/2012 | Kumar | G06F 17/5009 703/2 |
| 2006/0277008 A1* | 12/2006 | Suresh | G06F 17/5018 703/2 |
| 2014/0156053 A1 | 6/2014 | Mahdavi et al. | |
| 2015/0193559 A1* | 7/2015 | Musuvathy | B29C 67/0088 703/1 |
| 2016/0232262 A1* | 8/2016 | Shayani | G06T 17/10 |
| 2017/0083003 A1* | 3/2017 | Arisoy | G05B 19/4099 |

OTHER PUBLICATIONS

Barber et al., "The Quickhull Algorithm for Convex Hulls," ACM Transactions on Mathematical Software, 1996, 22(4):469-483.

(Continued)

*Primary Examiner* — Suresh Memula
(74) *Attorney, Agent, or Firm* — Fish & Richardson P.C.

(57) ABSTRACT

Methods, systems, and apparatus, including medium-encoded computer program products, for designing three dimensional lattice structures include, in one aspect, a method including: obtaining a lattice within a 3D lattice design space for a 3D model being created with a 3D modeling program; identifying junctions in the lattice that are potential sources of particle traps at an interface between the 3D lattice design space and a surface present in the 3D model; and removing the potential sources of particle traps by modifying cell space defined between the identified junctions and the surface. In addition, the surface can be a surface of a solid region defined in the 3D model, and the method can include: identifying beams in the lattice having junctions lying on the surface; and extending each of the identified beams by a length amount to cause overlap between the identified beams and the solid region.

20 Claims, 7 Drawing Sheets

(56) References Cited

OTHER PUBLICATIONS de Berg et al., "Computational Geometry—Algorithms and Applications," Third Edition, Springer, 2008, Chapter 11, Convex Hulls, pp. 243-258.
Peterson, "Computing Constrained Delaunay Triangulations in the Plane," (Jan. 2, 2015) [online] (retrieved from http://www.geom.uiuc.edu/~samuelp/del_project.html), 18 pages.
"Practical Algorithms for 3D Computer Graphics," Second Edition, by R. Stuart Ferguson, pp. 20 and 21, section 2.8 (4 pages).
Unknown Author, "Trabecula—Wikipedia the free encyclopedia," (Jan. 6, 2015) [online] (retrieved from http://en.wikipedia.org/wiki/Trabecula), 2 pages.
Unknown Author, "Within—Acetabular Cups Revised," (Jan. 6, 2015) [online] (retrieved from http://withinlab.com/case-studies/index13.php), 2 pages.
Ruto et al, "Within Enhance Technical Manual for Version 4.2," Mar. 31, 2014, 31 pages.
Ruto et al, "Within Enhance Technical Manual for Version 4.3," Jan. 15, 2015, 32 pages.
Ruto, "Within Medical Technical Manual for Version 4.2," Mar. 15, 2013, 48 pages.
Ruto, "Within Medical [Biomet Edition] Technical Manual for Version 4.2," Mar. 13, 2013, 27 pages.
Bethi, "Within Topology Editor Technical Manual for Version 1.0," Jun. 12, 2013, 16 pages.
Ruto, "Within Variable Technical Manual for Version 4.2," Jun. 26, 2013, 20 pages.
Ruto, "Within Lite Technical Manual for Version 4.2," Apr. 30, 2013, 18 pages.
Ruto et al., "Within Enhance Technical Manual for Version 4.1," Jul. 5, 2013, 45 pages.
Unknown Author, "Within—Software—General Overview," (Dec. 31, 2014) [online] (retrieved from http://withinlab.com/software/), 2 pages.

* cited by examiner

LATTICE STRUCTURE INTERFACING

CROSS-REFERENCE TO RELATED APPLICATIONS

This application claims the benefit under 35 U.S.C. §119(e) of U.S. Patent Application No. 62/189,908, entitled "LATTICE STRUCTURE INTERFACING", filed Jul. 8, 2015.

BACKGROUND

This specification relates to computer aided structure creation, such as generation of lattice structures for use with three dimensional (3D) modeling programs for use with additive manufacturing or other manufacturing techniques.

Computer-aided design (CAD) software has been developed and used to generate 3D representations of objects. Such software has also included software tools that can be used to enhance 3D parts using lattices and skins of various sizes, thicknesses and densities. Such tools allow rapid redesign of a 3D part to be lighter in weight, while still maintaining desired performance characteristics (e.g., stiffness and flexibility). Such software tools have used lattice topologies of various types that can be used to generate internal lattice structures that can be manufactured.

SUMMARY

This specification describes technologies relating to computer aided structure creation, such as generation of lattice structures with 3D modeling programs for use with additive manufacturing and 3D printing techniques.

In general, one or more aspects of the subject matter described in this specification can be embodied in one or more methods performed by a 3D modeling program on a computer including a processor and a memory, the method including: obtaining a lattice within a 3D lattice design space for a 3D model being created with the 3D modeling program; identifying junctions in the lattice that are potential sources of particle traps at an interface between the 3D lattice design space and a surface present in the 3D model; and removing the potential sources of particle traps by modifying cell space defined between the identified junctions and the surface.

The identifying can include, for each junction checked: comparing a distance between the junction and the surface with a threshold value; and noting the junction as a potential source of a particle trap when the distance compares disfavorably with the threshold value. In some cases, only junctions in the lattice that connect to junctions lying on the surface are checked, and the method includes calculating the distance between the junction and the surface as a distance between a center of the junction and the surface, minus half a thickness of the junction. The threshold value can be set in accordance with an additive manufacturing machine to be used to manufacture the lattice. Moreover, the threshold value can be a programmable parameter.

The removing can include, for each identified junction: removing beams between the junction and the surface; and moving the junction to the surface. The removing can include, for each identified junction: identifying center points of the junction and corresponding junctions on the surface that form the trap; generating a three dimensional convex hull from the center points; and adding the three dimensional convex hull to the lattice.

The surface can be a surface of a solid region defined in the 3D model, and the method can include: identifying beams in the lattice having junctions lying on the surface; and extending each of the identified beams by a length amount to cause overlap between the identified beams and the solid region. The method can also include changing the length amount for each of the identified beams based on an angle of incidence of the beam with the surface. Further, the obtaining can include generating the lattice using random variation in beam thickness and junction placement within the lattice.

One or more aspects of the subject matter described in this specification can be embodied in one or more systems including: a non-transitory storage medium having instructions of a 3D modeling program stored thereon; and one or more data processing apparatus configured to run the instructions of the 3D modeling program to (i) obtain a lattice within a 3D lattice design space for a 3D model being created with the 3D modeling program, (ii) identify junctions in the lattice that are potential sources of particle traps at an interface between the 3D lattice design space and a surface present in the 3D model, and (iii) remove the potential sources of particle traps by modifying cell space defined between the identified junctions and the surface.

The one or more data processing apparatus can be configured to run the instructions of the 3D modeling program to identify the junctions in the lattice that are potential sources of particle traps by performing operations including: comparing a distance between a junction and the surface with a threshold value; and noting the junction as a potential source of a particle trap when the distance compares disfavorably with the threshold value. In some implementations, only junctions in the lattice that connect to junctions lying on the surface are checked, and the one or more data processing apparatus can be configured to run the instructions of the 3D modeling program to calculate the distance between the junction and the surface as a distance between a center of the junction and the surface, minus half a thickness of the junction.

The threshold value can be set in accordance with an additive manufacturing machine to be used to manufacture the lattice. The threshold value can be a programmable parameter. The one or more data processing apparatus can be configured to run the instructions of the 3D modeling program to remove the potential sources of particle traps by performing operations including, for each identified junction: removing beams between the junction and the surface; and moving the junction to the surface. The one or more data processing apparatus can be configured to run the instructions of the 3D modeling program to remove the potential sources of particle traps by performing operations including, for each identified junction: identifying center points of the junction and corresponding junctions on the surface that form the trap; generating a three dimensional convex hull from the center points; and replacing beams in the lattice connecting the identified center points with the three dimensional convex hull.

The surface can be a surface of a solid region defined in the 3D model, and the one or more data processing apparatus can be configured to run the instructions of the 3D modeling program to perform operations including: identifying beams in the lattice having junctions lying on the surface; and extending each of the identified beams by a length amount to cause overlap between the identified beams and the solid region. The length amount can be a same fixed amount for all identified beams. Further, the system can include an additive manufacturing machine, and the one or more data processing apparatus can be configured to run the instructions of the 3D modeling program to generate a 3D model of an object that includes the lattice and output the 3D model to the additive manufacturing machine for additive manufacturing of the object without the particle traps.

Particular embodiments of the subject matter described in this specification can be implemented to realize one or more of the following advantages. The generation of lattice designs in 3D models can be provided with robust lattice-solid interfaces, reducing or eliminating faulty or disconnected pieces. This can be accomplished in a computationally efficient manner and also guarantee good connection between lattice and solid regions regardless of the design space and additive manufacturing (AM) parameter settings. Moreover, computational efficiency can still be realized while also taking into account AM parameter settings, details of the design space, or both.

In addition, potential sources of particle traps can be detected and eliminated in lattice structures. Critical conditions in fine lattice/porous structures can be quickly checked and corrected. This can provide significant benefits in applications that are sensitive to release of the trapped particles during the component lifecycle, such as medical implants created using additive manufacturing techniques. The systems and techniques described are applicable to multiple different lattice structures and can provide additional benefits when used with randomly generated fine lattice structures.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
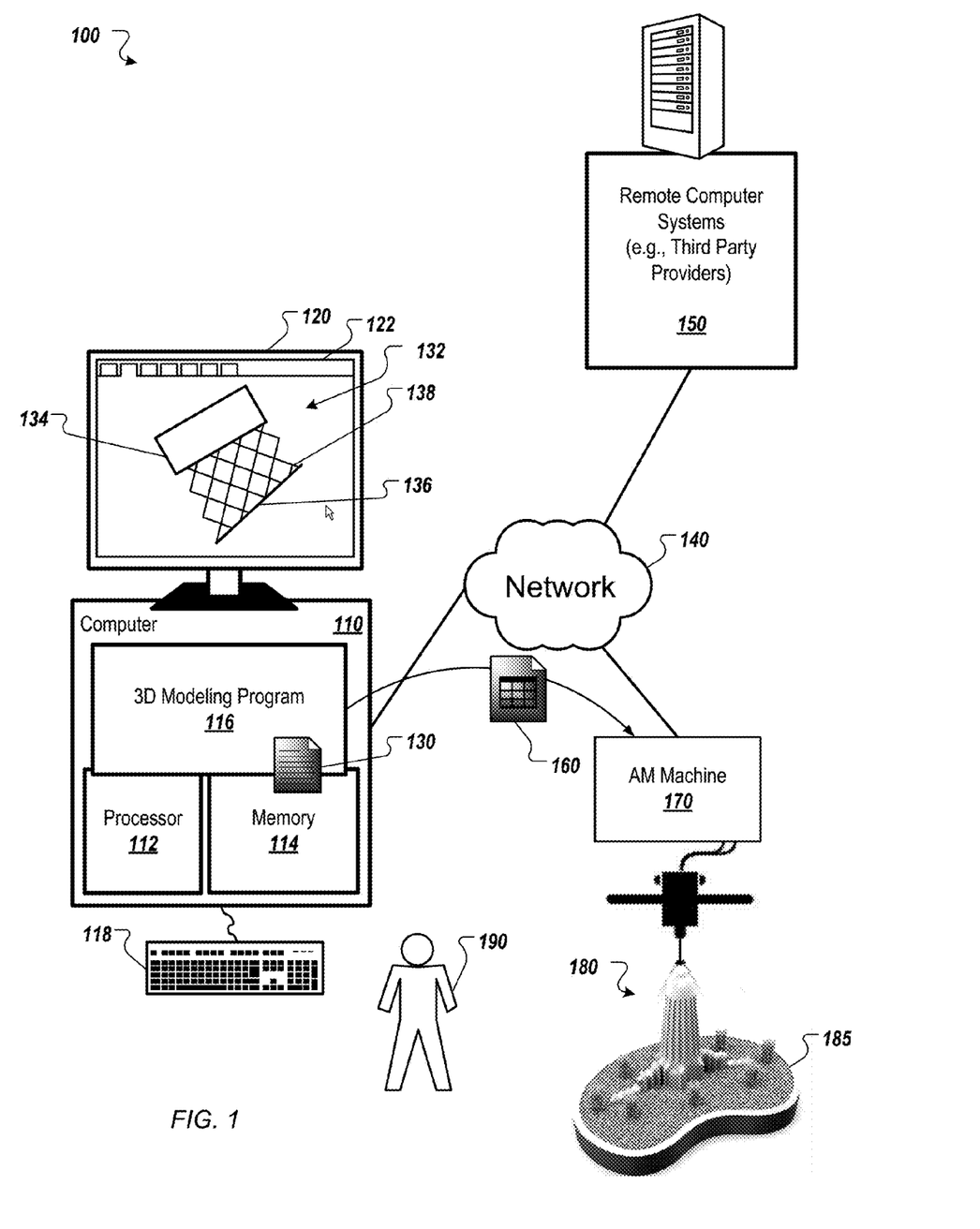
FIG. 1 shows an example of a system usable to design and manufacture lattice structures with improved connections at the interface between lattice and surfaces in a 3D model.

FIG. 1 shows an example of a system 100 usable to design and manufacture lattice structures with improved connections at the interface between lattice and surfaces in a three dimensional (3D) model. In the example shown, a laser sintering machine is used, but the invention is not limited to use with a particular type of additive manufacturing system. The systems and techniques described herein can be used with various types of additive manufacturing (AM) and three dimensional (3D) printing, but in general, the described techniques apply to manufacturing methods that use particles or powder as their basis for constructing 3D objects. During the curing or bonding phase, the lattice interfacing design alterations described herein can ensure sufficient overlap between lattice structures and other portions of a 3D model so as to create a stronger bond. Note that the beams and solid interfaces should be treated as independent designs during the manufacturing phase to facilitate the use of the overlapping technique. Moreover, particle trap removal can allow for particles to be removed post manufacture.

A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can run locally on computer 110 or remotely on a computer of one or more remote computer systems 150 (e.g., in a server system accessible by the computer 110 via the network 140). The 3D modeling program 116 presents a user interface (UI) 122 on a display 120 of the computer 110, which can be operated using one or more input devices 118 of the computer 110 (e.g., keyboard and mouse). Note that while shown as separate devices in FIG. 1, the display 120 and/or input devices 118 can also be integrated with each other and/or with the computer 110, such as in a tablet computer.

A user 190 can interact with the 3D modeling program 116 to create a 3D model 132. This can be done using known graphical user interface tools. The 3D model can include portions 134, 136 that are traditional 3D model components, which can be defined using solid models (e.g., voxels) or surface models (e.g., B-Rep (Boundary Representation), surface meshes). In addition, the UI 122 of the program 116 can allow the user 190 to provide input specifying one or more regions of the 3D model in which to generate a lattice 138. For example, in some implementations, the user 190 can define a B-rep and specify a general type of lattice to include on one side of that B-rep, then the computer 110 can automatically generate the full lattice 138, including potentially adding variation to the internal structure of the lattice 138. In some cases, the variation can be entirely arbitrary, and in other cases, the variation can be governed by one or more factors, such as how close the portion of the lattice 138 is to specified location(s) or surface(s) within the 3D model 132 or how some beams in the lattice need to bear loads in different directions. In some implementations, the lattice 138 can be generated with random (or pseudorandom) variations in beam shape and type, length, thickness, orientation with respect to the junctions, or a combination of these.

The 3D modeling program 116 can also facilitate manipulation of the 3D model 132, which can include adding, deleting, or changing components 134, 136 of the model 132, including components that intersect with the lattice 138, and also changing the extent and inclusion of the lattice 138 (e.g., by defining a containing envelope for the lattice structure 138). Once the user 190 is satisfied with the model 132 and its lattice 138, the 3D model 132 and its lattice 138 can be stored as a document 130 and/or used to generate another representation of the model (e.g., an .STL file for additive manufacturing) with the lattice 138 included therein. This can be done upon request by the user 190, or in light of the user's request for another action, such as sending the 3D model 132 to an AM machine 170, which can be directly connected to the computer 110, or connected via a network 140, as shown. This can involve a post-process carried out on the local computer 110 or a cloud service to export the 3D model 132 to an electronic document from which to manufacture.

In addition, the user 190 can save or transmit the 3D model 132, with its lattice 138, for later use. For example, the 3D modeling program 116 can store the document 130 that includes the 3D model 132 and its lattice 138. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the 3D modeling program 116 can create an accurate representation of a combination of the 3D model component(s) 134, 136 and the lattice 138, and provide a document 160 (of an appropriate format) to the AM machine 170 to create a complete structure 180, including lattice structure 185. In the example shown, the 3D model is used to manufacture a tibial tray 180, which is part of an implant used for total knee arthroplasty. This part attaches to the shinbone and supports the upper part of the implant, and so the lattice 185 is added to improve the ability of the shinbone to grow into, and thus attach to, the tibial tray 180. This is but one of many possible 3D models that can be designed and improved using lattice structures. For example, with additive manufacturing systems and techniques, there is opportunity to make parts both lighter and stronger by replacing internal regions of the part with lattice structures. In addition, using the systems and techniques described further below, such lattice structures can be created automatically with improved interfacing between lattice and other components of the model.

The AM machine 170 can employ one or more additive manufacturing techniques, such as granular techniques (e.g., Selective Laser Sintering (SLS) and Direct Metal Laser Sintering (DMLS)), extrusion techniques (e.g., Fused Deposition Modelling (FDM)), or others. When lattice structures are created by the program 116, lattice beams can be trimmed at the surface of the lattice design space. At the interface between a lattice design space and a solid region, some void regions may appear in the final meshed lattice design, which can lead to a brittle or disconnected structure at the interface when manufactured using AM or 3D printing. Furthermore, very small cells with very small window sizes can form at the interface of the lattice (e.g., a randomly generated porous/lattice structure) with solid 134 and skin 136 regions, and also in some internal parts of the random lattice structures that have limited control over the distribution of the pore and window size of the lattice structure.

These cells can trap the powder used in the AM process. This trapped powder may not be melted or sintered and so may not be properly integrated to the rest of the body of the component, but rather stays inside the cell and cannot be extracted during the post processing stages of the AM process (such as cleaning, washing and air blowing). However, these trapped particles can be released during the lifecycle of the component. In some applications (such as, but not restricted to, medical implants) these released particles can cause damage to the host system. For example, when released in the patient's body, these can cause cancer or other complications. To address these issues, the 3D modeling program 116 can be designed to prevent void regions in the final meshed lattice design at lattice-solid interfaces, detect and eliminate potential particle traps, or both.

Figure 2A:
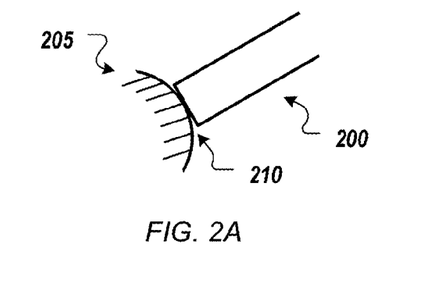
FIGS. 2A-2D show examples of beam extension for lattice-solid interfacing.

FIGS. 2A-2D show examples of beam extension for lattice-solid interfacing. When lattice beams are added in a lattice design space, the beams are truncated at the edge of that lattice design space, which can be a solid region in a 3D model. Thus, as shown in FIG. 2A, a beam 200 can terminate at the surface of a solid 205 in the 3D model. However, because the termination point can be set based on the intersection of a central axis of the beam 200 with the surface of the solid 205, one or more voids 210 may be created.

Figure 2B:
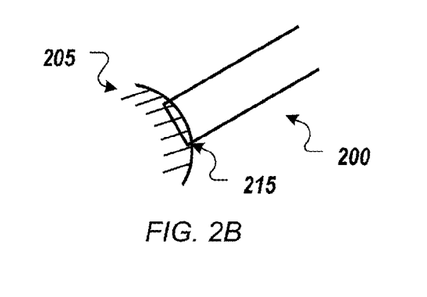

To address this issue, the lattice beams at the surface of the lattice design space that are touching the surface of a solid region can be extended by an extension length (e.g., by fractions of a millimeter) into the solid region. FIG. 2B shows the result of such an extension for the beam 200, where overlap 215 is created between the beam 200 and the solid 205. Such overlap between the lattice manifold and the solid manifold ensures that a robust connection is established between them, specifically when different parameter settings are used to print the lattice and solid elements during an AM process. The overlap can allow for more energy to be administered locally at the lattice solid interface during the manufacturing process, therefore allowing for more material to be bonded at the interface to strengthen the connectivity of both elements, i.e., lattice and solid.

Note that the extension is a simple process, which does not require using Boolean operations on the mesh surfaces of the design space that are larger than the original design space to create an overlap between lattice and solid. Such Boolean operations can be computationally intensive and still not guarantee a good connection depending on the shape of the design space and AM parameter settings used. In some implementations, the extension amount is a fixed length that is applied to all beams that truncate at a solid in the 3D model. The fixed length can be a fixed amount for all 3D models and AM processes, or the fixed length can be set for a given 3D model based on the AM process to be used.

Figure 2C:
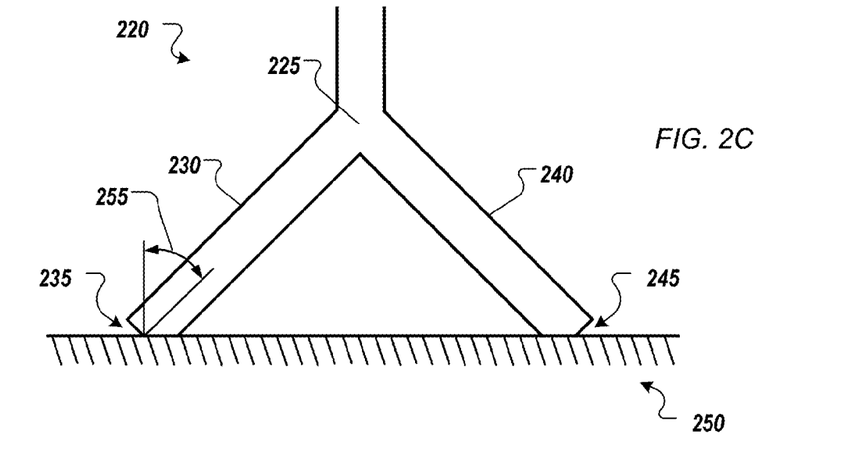

In addition, in some implementations, the extension amount can be varied for each beam based on an aspect of the beam and the surface at which it truncates. For example, FIG. 2C shows a 2D representation of a lattice 220 with a junction 225 that has two beams 230, 240 extending from the junction 225 to a surface of a solid region 250. As will be appreciated, the 2D representation is used for ease of explanation. In practice, the lattice will be a 3D lattice structure, which can have many different lattice configurations, both in terms of base units forming the lattice and (potentially) random variation built into the lattice structure.

Figure 2D:
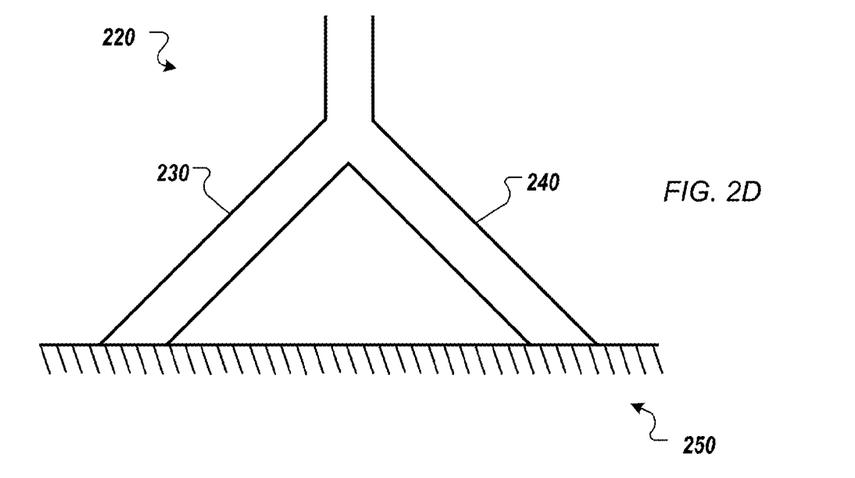

As shown, each beam 230, 240 has a corresponding void 235, 245 due to its truncation at the surface of the solid region 250. In addition, each beam 230, 240 forms an angle between its central axis and a normal to the surface at the point where this central axis intersects the surface, for example, beam 230 forms angle 255. This angle (or a similar angle) can be used to adjust the extension amount. Thus, the extension amount for each beam can vary as a function of an angle between the beam and the surface, in addition to potentially varying the extension amount based on the AM process to be used. After extension, as shown in FIG. 2D, the voids 235, 245 have been eliminated for each beam 230, 240.

Figure 2E:
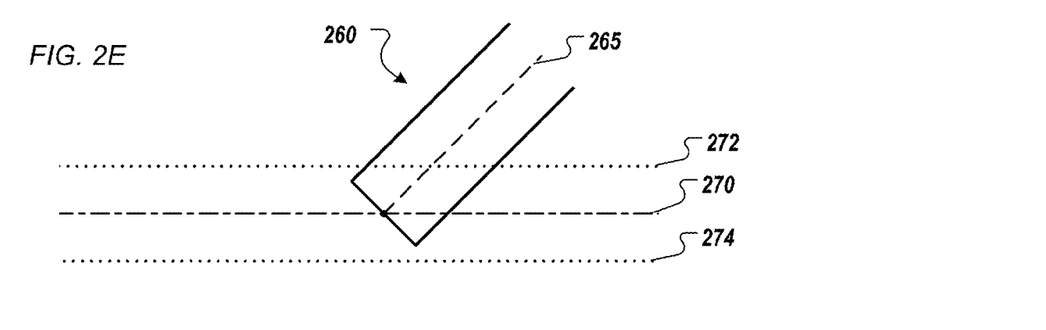
FIGS. 2E-2G show additional examples of lattice-skin interfacing.

Furthermore, in some implementations, "skins" can be handled differently from solid regions generally. A "skin" is a thin volume that can be generated by the 3D modeling program for a lattice design space, e.g., based on user input, to create lightweight designs. FIG. 2E shows an example of beam 260 of a lattice structure (not shown) that has a central axis 265 (the lattice beam vector) that terminates at the boundary 270 of a lattice design space. Note that while the boundary 270 is shown as a straight line in this 2D representation, it can of course be many different shapes in the 3D modeling space. In addition, the user can be allowed to specify a thickness for the skin to be created for the lattice design boundary 270, where the skin can be extruded inward to a new internal (to the lattice design space) boundary 272, or the skin can be extruded outward to a new external (to the lattice design space) boundary 274, thus creating the skin volume. In some implementations, the extrusion to create the skin can be done in in both directions, but it can still be useful to trim to the mid skin plane to allow for a good overlap between lattice and skin.

After creation of the skin, the beam 260 (and other beams in the lattice) can be extended into the skin, e.g., after the skin is extruded outward from the lattice design space. Further, the lattice can be trimmed by cutting off its beam vectors (e.g., central axis 265) at a boundary that lies between the inner and outer surfaces of the skin. Extending beams into a skin to create an overlap can improve the connectivity between lattices and skins when manufactured, using the same effect as described above for solids, but the beams should also be prevented for protruding through the outer surface of the skin.

Figure 2F:
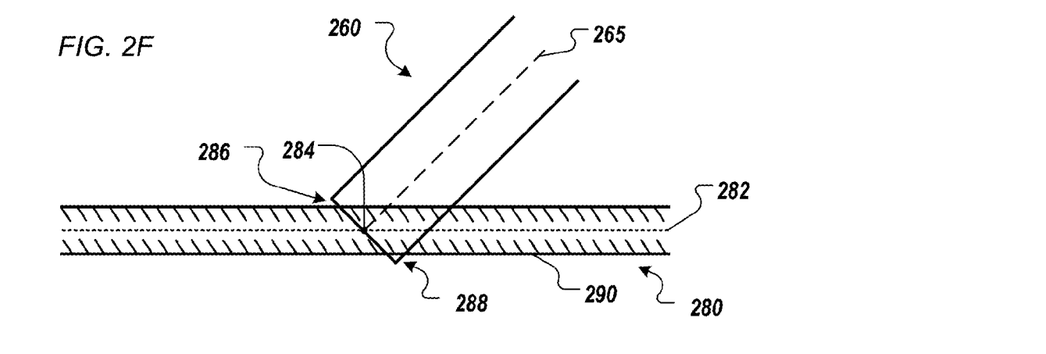

FIG. 2F shows an example in which the beam 260 is trimmed by cutting off its central axis 265 at a point 284 where it intersects a mid-plane boundary 282 of a skin 280. Trimming at the mid-plane boundary 282 is a computationally efficient approach to getting a good connection for most beams, but as shown in FIG. 2F, this can still result in voids (e.g., void 286) and protrusions (e.g., protrusion 288) depending on the size of the beam, its angle, and the thickness of the skin. Thus, in addition to the extension and trimming that can be performed in a pre-processes to lattice-skin interfacing, an additional extension and trimming can be performed in the process of lattice-skin interfacing itself.

Figure 2G:
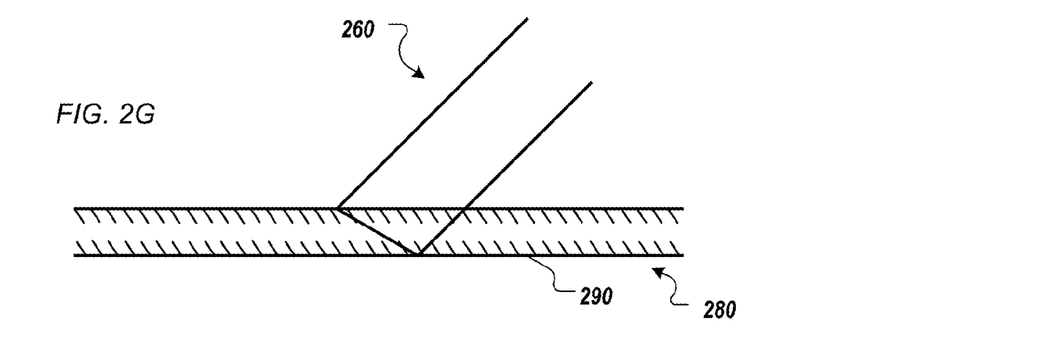

A second round of extension can use a different extension amount from the first round, can be applied to a limited number of beams (based on beam angle and size relative to the skin), or both. In any event, once appropriate extensions and basic trimming (based on the beam vectors) have been performed, additional, more computationally intensive trimming can be employed. For example, a trimming operation can be performed to trim lattice beam volumes to the outer surface 290 of the skin 280 (an "intermediate trim"), or a trimming operation can be performed to trim both lattice beam and surface junction volumes to the outer surface 290 of the skin 280 (an "advanced trim"). These trimming methods can be employed incrementally to improve performance, such as by applying a basic trim first to reduce lattice beam volumes, then apply an intermediate trim to reduce lattice volumes, and finally apply an advanced trim. FIG. 2G shows an example of the final result of the beam 260 having been extended and then trimmed to the outer surface 290 of the skin 280.

Figure 3A:
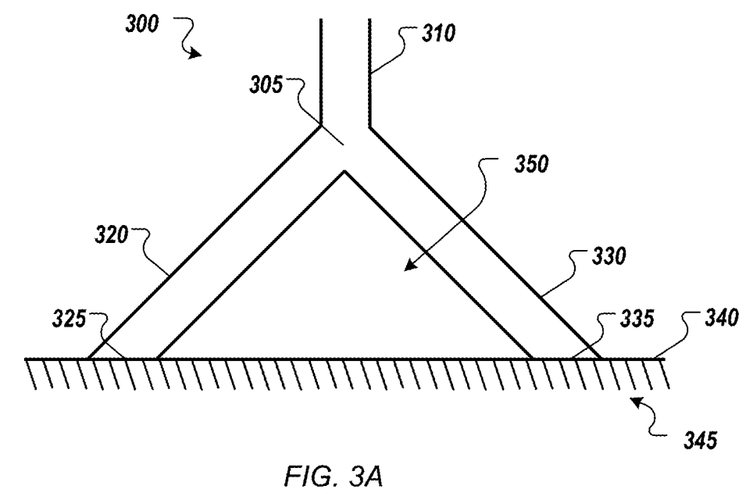
FIGS. 3A-3B show an example of particle trap elimination in a lattice.
Figure 3B:
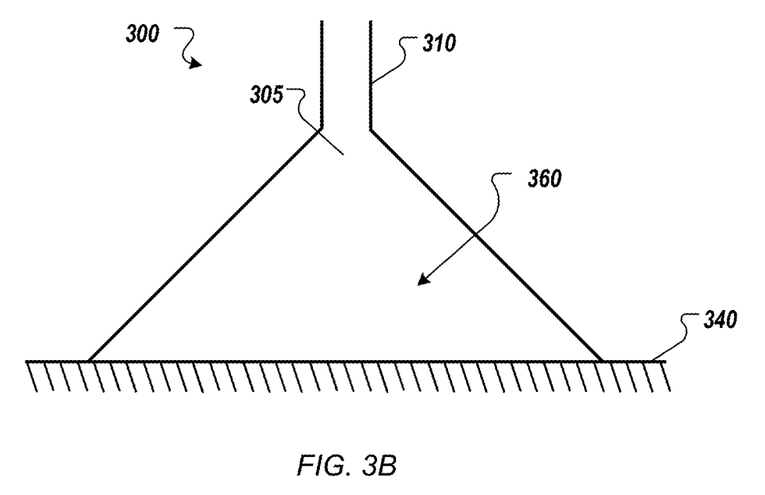

In addition (or in the alternative) to the beam extension techniques described above, the lattice generated in the lattice design space can be checked for potential particle traps, as noted above. FIGS. 3A-3B show an example of particle trap elimination in a lattice. FIG. 3A shows a 2D representation of a lattice 300 with a junction 305 that has a beam 310, which connects with the main part of the lattice structure (not shown), and also has two beams 320, 330 that extend from the junction 305 to junctions 325, 335 at a surface 340 of a solid region 345. Again, as will be appreciated, the 2D representation here is used for ease of explanation. In practice, the lattice will be a 3D lattice structure, which can have many different lattice configurations, both in terms of base units forming the lattice and (potentially) random variation built into the lattice structure. Thus, there can be more than one beam 310 connecting the junction 305 with the main part of the lattice structure, and there can be more than two beams 320, 330 connecting the junction 305 with the surface 340 of the solid region 345. Moreover, the systems and techniques described here for eliminating particle traps are applicable to any interface between a lattice and a surface in a 3D model, and a solid region 345 is not strictly required.

As shown in FIG. 3A, the beams 320, 330 that join with the surface form an empty region 350. If this region 350 is small enough, it can trap materials used during AM processes to manufacture the beams 320, 330, such as powder used in DMLS. In order to avoid this risk, at the design stage, the 3D modeling software can check all the lattice cells, or in some cases only the lattice cells at the interface with the solid and skin regions in the 3D model, and detect the ones that are prone to trap particles. Once detected, these cells can be filled in 360, as shown in FIG. 3B. Different methods can be used to detect and eliminate these potential traps. In some implementations, the distance of the junction 305 to the (skin or solid) surface 340 is calculated and if it is less than a threshold the cell created by this junction and the surface is assumed a potential trap and so is removed.

Figure 4:
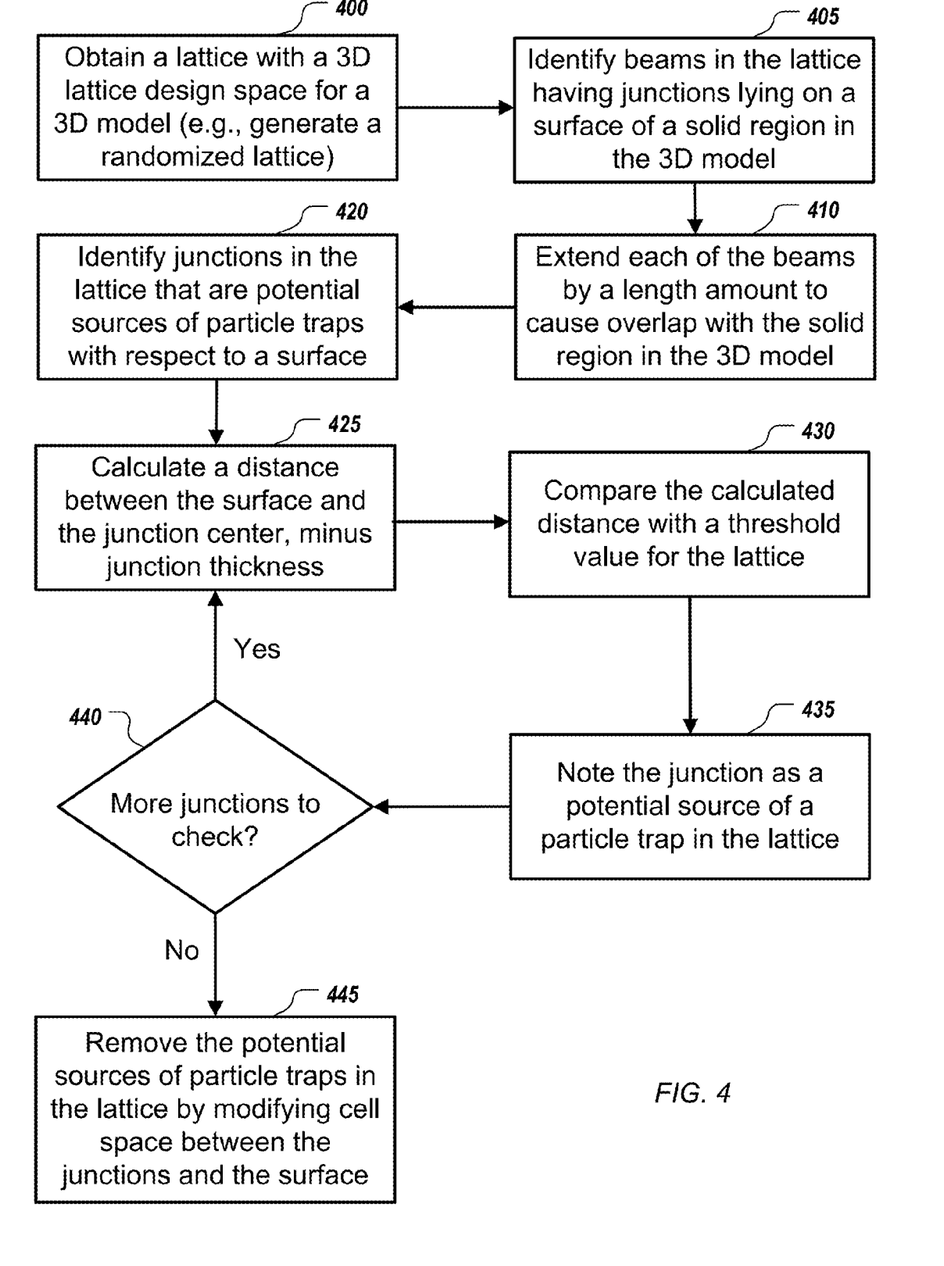
FIG. 4 shows an example of a process to improve connections at the interface between lattice and surfaces in a 3D model.

FIG. 4 shows an example of a process to improve connections at the interface between lattice and surfaces in a 3D model, which incorporates both beam extension and particle trap elimination. However, in various implementations, only one of beam extension and particle trap elimination need be implemented, rather than both. A lattice is obtained 400 within a 3D lattice design space for a 3D model being created with the 3D modeling program. This can involve loading a previously generated lattice or generating the lattice. For example, this can involve generating 400 the lattice using random variation in beam thickness and junction placement within the lattice in the lattice design space.

In some implementations, the variables of lattice generation that can be randomized include the junction positions, beam length and beam thickness. However, the techniques described herein are equally applicable to random or non-random lattice structures, and such different lattice structures can be treated in the same manner. In addition, the systems and techniques described can be used with multiple different lattice topologies.

Beams can be identified 405 in the lattice, where those beams have junctions lying on a surface of a solid region defined in the 3D model. This can involve looking for beams that are truncated by the surface, or checking for lattice junctions that are within a specified distance of the surface and identifying beams that extend from those junctions toward the surface. In some cases, the solid region can be a skin volume that was created based on a known boundary of the lattice design space. In general, lattice beams that should be extended are those that have a junction connecting to a solid surface region, where the solid surface region can be a collection of polygons tagged by a user of the 3D modeling software as being a solid interface in the 3D model, or the solid surface region can be a manifold defined in the 3D modelling software.

Each of the identified beams can be extended 410 by a length amount to cause overlap between the identified beams and the solid region. This can involve extending each beam by a nominal fixed amount (e.g., 0.1 mm). Alternatively, this can involve extending each beam based on an angle of incidence of the beam to the surface. For example, the extension amount (E) can be determined in accordance with:

$$E = C + T \times \tan(\theta),$$

where C is a base amount (e.g., 0.1 mm), T is a beam thickness amount (e.g., a radius value of the incident beam), and $\theta$ is an angel of incidence (e.g., the angle between a central axis of the beam and a normal to the surface at the point of incidence). Note that the nominal fixed amount in the one case, and the base amount in the other, can be dependent on the scale of the 3D model, the AM process to be used, or both. In addition, there can be cutoff values used for $\theta$ in the equation above to avoid calculating tan(0) or creating an extension that is too long (e.g., the value of tan ($\theta$) can be held constant once $\theta$ drops below 10 degrees or exceeds 45 degrees).

In this manner, an overlap is quickly created between lattice beams and solid regions in the 3D model. Then, when the 3D model is manufactured (e.g., 3D printed), this overlap results in additional bonding of the beam to the solid region. In some cases, this improved bonding can be irrespective of the 3D printing method used or parameters which define the way in which a 3D printer bonds material to form 3D shapes, e.g., in laser sintering, parameters can define laser power and sintering duration. Moreover, in the case of thin skins, the beams can be trimmed to a boundary within the skin (e.g., a mid-plane of the skin) as described above, and in some cases further extension and trimming can be employed to prevent voids and protrusions.

Further, junctions in the lattice that are potential sources of particle traps at an interface between the 3D lattice design space and a surface present in the 3D model can be identified 420. This can involve checking all the junctions, or only checking junctions in the lattice that connect to junctions lying on the surface. For example, only junctions that are within a certain distance of the surface, or only junctions that are known to have beams that connect to the surface (e.g., from a prior beam extension process) need be checked.

In some implementations, the distance between the junction and the surface can be calculated 425 as a distance between a center of the junction and the surface, minus half a thickness of the junction. The distance between the junction and the surface can be compared 430 with a threshold value. The junction can be noted 435 as a potential source of a particle trap when the distance compares disfavorably with the threshold value. In some implementations, the threshold value can be set in accordance with an additive manufacturing machine to be used to manufacture the lattice. For example, in some implementations, the threshold can be 200 microns, which is the smallest printable feature size in titanium used to manufacture medical implants. In some implementations, the threshold value can be a programmable parameter, which can be modified to suit other materials. For example, for most metals, the minimum feature size will be between 200 and 400 microns, and the threshold can be changed within this range. Other ranges can be used for other AM processes, such as 1 to 2 mm for plastics, depending on the AM machine used.

This threshold can also be calculated by taking into account the typical particle sizes of the powder used, the printing accuracy for the 3D printing method used (typically this will be the smallest printable feature size), and the estimated window size of beams that are connected between a checked junction and surface junctions. An upper bound for the particle size of the powder used can be estimated as the average particle size for the powder plus two standard deviations. This upper bound can be used as the particle trap threshold, which is checked against the window size to determine whether particles will likely be trapped. When a checked junction is connected to more than two beams (a group), that junction forms a set of "windows", which are the triangles formed by the checked junction and respective pairs of surface junctions. The window size for the checked junction corresponds to these triangles, e.g., the window size for the checked junction can be the diameter of the smallest window between the checked junction and two surface junctions. If a window at a checked junction has a smaller diameter than the particle trap threshold, then there is a high likelihood that powder will be trapped.

While more junctions remain to be checked 440, the process can continue with calculating 425 the distance for a next junction that may form a cell that is a potential particle trap. Once all the potential particle traps have been identified, the potential sources of particle traps can be removed 445 from the lattice by modifying cell space defined between the identified junctions and the surface. This removal can be done in various manners.

For example, the junction can be deleted by moving the junction to the surface and removing all the beams between the junction and the surface. This method may lead to too large pores/windows at the interface or too long/weak beams. These can be consequently overcome by thickening up the beam (or potentially only the beam end connected to the surface). Alternatively, the cell that is the potential particle trap can be filled. This can be carried out by moving all the vertices of the junction mesh, except for those ones that belong to the beam that is not connected to the surface, on their projections on the surface. Optionally, these vertices can be welded and redundant vertices and polygons be deleted to simplify the lattice mesh. Another possible approach is now described in connection with FIG. 5.

Figure 5:
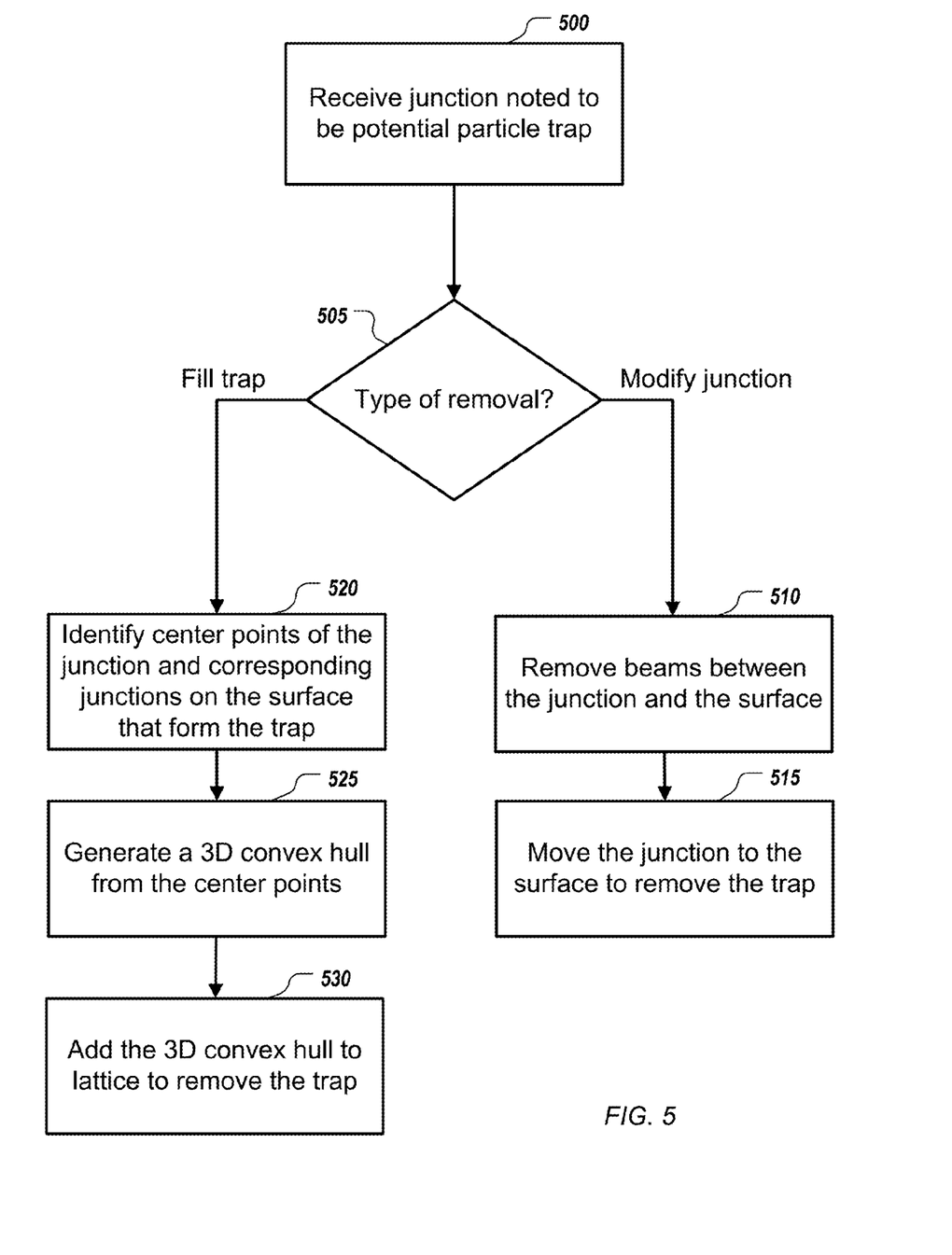
FIG. 5 shows an example of processes to remove particle traps in a lattice.

FIG. 5 shows an example of processes to remove particle traps in a lattice. A junction that has been noted as forming a cell with a surface that is a potential particle trap is received 500. Two types of removal are possible: filling the trap, and modifying the junction. In some implementations, both such removal processes are available for each identified junction, and a determination can be made 505 regarding which type of removal to employ. For example, the distance between the junction and the surface can be checked 505 and a removal type can be selected based on the distance If the distance is relatively small, e.g., less than half the particle trap threshold, the junction can be modified by removing 510 beams between the junction and the surface, and then moving 515 the junction to the surface to eliminate the trap. On the other hand, if the distance is relatively large, e.g., equal to or greater than half the particle trap threshold, the trap can be filled in by identifying 520 center points of the junction and corresponding junctions on the surface that form the trap, generating 525 a three dimensional convex hull from the identified center points, and then adding 530 the three dimensional convex hull to the lattice to fill in the trap. As noted above, other approaches to removing the potential particle trap can also be used. For example, as another possibility, the beams in the lattice connecting the identified center points can be replaced 530 with the three dimensional convex hull.

Figure 6:
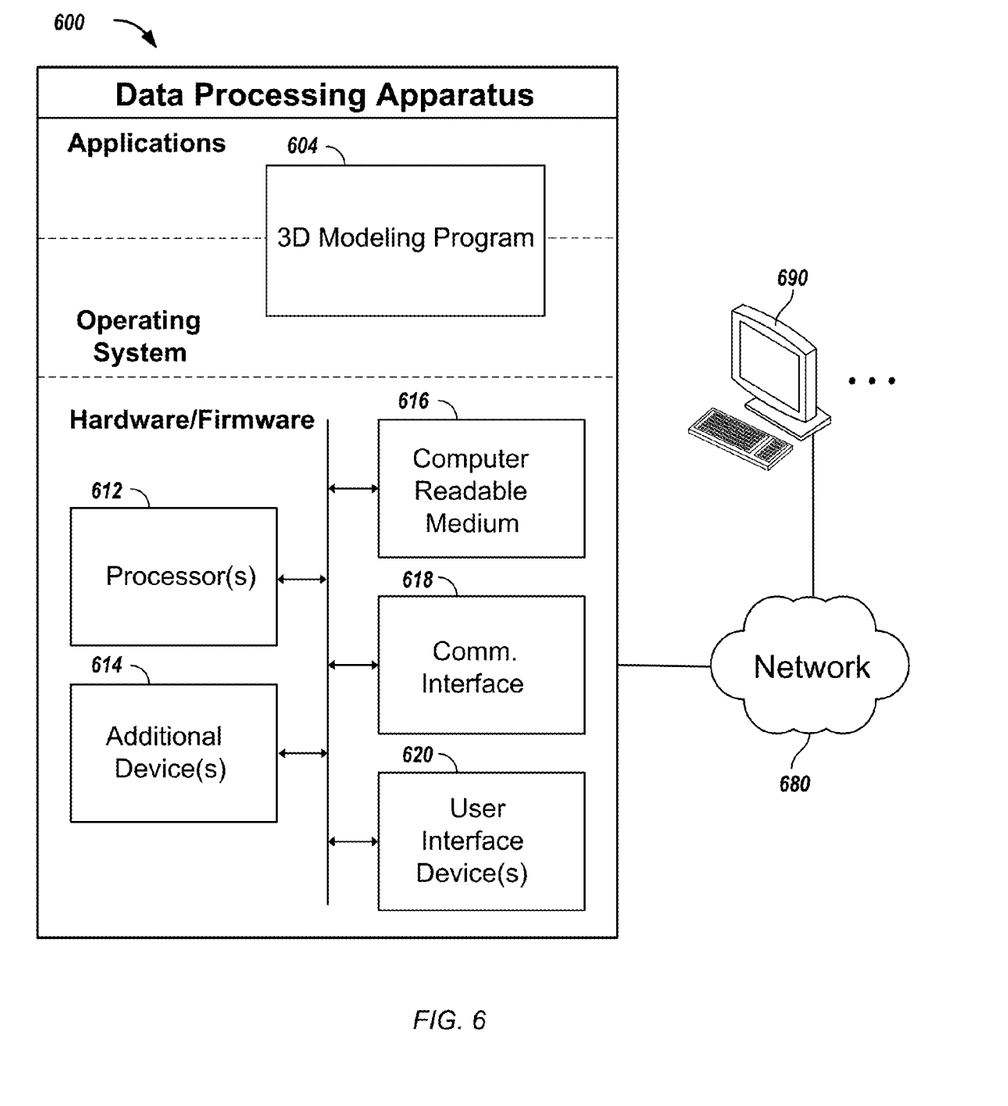
FIG. 6 is a schematic diagram of a data processing system.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of a 3D modeling program 604, such as described above. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over a network 680. Examples of user interface devices 620 include a display, a camera, a speaker, a microphone, a tactile feedback device, a keyboard, and a mouse. The data processing apparatus 600 can store instructions that implement operations associated with the modules described above, for example, on the computer readable medium 616 or one or more additional devices 614, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method performed by a three dimensional (3D) modeling program on a computer comprising a processor and a memory, the method comprising:

obtaining a lattice within a 3D lattice design space for a 3D model being created with the 3D modeling program;

identifying junctions in the lattice that are potential sources of particle traps at an interface between the 3D lattice design space and a surface present in the 3D model; and removing the potential sources of particle traps by modifying cell space defined between the identified junctions and the surface.

2. The method of claim 1, wherein the identifying comprises, for each junction checked:

comparing a distance between the junction and the surface with a threshold value; and noting the junction as a potential source of a particle trap when the distance compares disfavorably with the threshold value.

3. The method of claim 2, wherein only junctions in the lattice that connect to junctions lying on the surface are checked, and the method comprises calculating the distance between the junction and the surface as a distance between a center of the junction and the surface, minus half a thickness of the junction.

4. The method of claim 2, wherein the threshold value is set in accordance with an additive manufacturing machine to be used to manufacture the lattice.

5. The method of claim 2, wherein the threshold value is a programmable parameter.

6. The method of claim 1, wherein the removing comprises, for each identified junction:

removing beams between the junction and the surface; and moving the junction to the surface.

7. The method of claim 1, wherein the removing comprises, for each identified junction:

identifying center points of the junction and corresponding junctions on the surface that form the trap;

generating a three dimensional convex hull from the center points; and adding the three dimensional convex hull to the lattice.

8. The method of claim 1, wherein the surface comprises a surface of a solid region defined in the 3D model, and the method comprises:

identifying beams in the lattice having junctions lying on the surface; and extending each of the identified beams by a length amount to cause overlap between the identified beams and the solid region.

9. The method of claim 8, comprising changing the length amount for each of the identified beams based on an angle of incidence of the beam with the surface.

10. The method of claim 1, wherein the obtaining comprises generating the lattice using random variation in beam thickness and junction placement within the lattice.

11. A system comprising:

a non-transitory storage medium having instructions of a three dimensional (3D) modeling program stored thereon; and one or more data processing apparatus configured to run the instructions of the 3D modeling program to (i) obtain a lattice within a 3D lattice design space for a 3D model being created with the 3D modeling program, (ii) identify junctions in the lattice that are potential sources of particle traps at an interface between the 3D lattice design space and a surface present in the 3D model, and (iii) remove the potential sources of particle traps by modifying cell space defined between the identified junctions and the surface.

12. The system of claim 11, wherein the one or more data processing apparatus are configured to run the instructions of the 3D modeling program to identify the junctions in the lattice that are potential sources of particle traps by performing operations comprising:
    comparing a distance between a junction and the surface with a threshold value; and
    noting the junction as a potential source of a particle trap when the distance compares disfavorably with the threshold value.

13. The system of claim 12, wherein only junctions in the lattice that connect to junctions lying on the surface are checked, and the one or more data processing apparatus are configured to run the instructions of the 3D modeling program to calculate the distance between the junction and the surface as a distance between a center of the junction and the surface, minus half a thickness of the junction.

14. The system of claim 12, wherein the threshold value is set in accordance with an additive manufacturing machine to be used to manufacture the lattice.

15. The system of claim 12, wherein the threshold value is a programmable parameter.

16. The system of claim 11, wherein the one or more data processing apparatus are configured to run the instructions of the 3D modeling program to remove the potential sources of particle traps by performing operations comprising, for each identified junction:
    removing beams between the junction and the surface; and
    moving the junction to the surface.

17. The system of claim 11, wherein the one or more data processing apparatus are configured to run the instructions of the 3D modeling program to remove the potential sources of particle traps by performing operations comprising, for each identified junction:
    identifying center points of the junction and corresponding junctions on the surface that form the trap;
    generating a three dimensional convex hull from the center points; and
    replacing beams in the lattice connecting the identified center points with the three dimensional convex hull.

18. The system of claim 11, wherein the surface comprises a surface of a solid region defined in the 3D model, and the one or more data processing apparatus are configured to run the instructions of the 3D modeling program to perform operations comprising:
    identifying beams in the lattice having junctions lying on the surface; and
    extending each of the identified beams by a length amount to cause overlap between the identified beams and the solid region.

19. The system of claim 18, wherein the length amount is a same fixed amount for all identified beams.

20. The system of claim 11, further comprising an additive manufacturing machine, wherein the one or more data processing apparatus are configured to run the instructions of the 3D modeling program to generate a 3D model of an object that includes the lattice and output the 3D model to the additive manufacturing machine for additive manufacturing of the object without the particle traps.

* * * * *